| United States Patent [19] | [11] 3,769,173 |
|---|---|
| Carroll | [45] Oct. 30, 1973 |

[54] DETERMINATION OF GAMMA-GLUTAMYL TRANSPEPTIDASE IN BIOLOGICAL FLUIDS

[75] Inventor: James J. Carroll, East Hanover, N.J.

[73] Assignee: Warner-Lambert Company, Morris Plains, N.J.

[22] Filed: Aug. 21, 1972

[21] Appl. No.: 282,632

[52] U.S. Cl............................................ 195/103.5 R
[51] Int. Cl. ............................................ G01n 31/14
[58] Field of Search .............................. 195/103.5 R

[56] References Cited
UNITED STATES PATENTS
3,703,441   11/1972   Nakanishi et al. ............ 195/103.5 R OTHER PUBLICATIONS
Glick, Methods of Biochemical Analysis Vol. 13 Pages 347 & 348 (1965).

Primary Examiner—Alvin E. Tanenholtz
Attorney—Albert H. Graddis et al.

[57] ABSTRACT

A method for determining gamma-glutamyl transpeptidase in biological fluids is described which comprises incubating the test fluid with an aqueous buffered solution of an L-gamma-glutamyl-p-nitroanilide substrate, glycylglycine, sodium nitrite, and optionally, magnesium chloride hexahydrate, for a predetermined period of time; adding, after incubation is completed, a mineral acid reagent solution of 8-hydroxy quinoline sulfate containing a water soluble, nonionic emulsifier, the mineral acid solution having a pH of between 0.8 and 1.3; adding an alkaline solution which will impart a pH of between 10.5 and 12, in the total reaction solution, said alkaline solution optionally containing ethylenediaminetetraacetic acid, tetrasodium salt; and reading the optical density of the total reaction solution as a measure of gamma-glutamyltranspeptidase concentration in the test sample of biological fluid. The method of the invention is accurate and approximately 4.5 times more sensitive than the standard test method currently being used.

11 Claims, No Drawings

DETERMINATION OF GAMMA-GLUTAMYL TRANSPEPTIDASE IN BIOLOGICAL FLUIDS

BACKGROUND OF THE INVENTION gamma-Glutamyl transpeptidase is an enzyme found in kidney extracts which catalyzes transpeptidation reactions involving metabolic gamma-glutamyl peptides and amino acids, wherein new peptides are formed containing the gamma-glutamyl moiety. The reaction consists in the transfer of the gamma-glutamyl group from linkage with the peptide to linkage with the amino acid group in an "acceptor " amino acid. Thus, transpeptide reactions result in a redistribution of gamma-glutamyl groups.

gamma-Glutamyl transpeptidase is found primarily in the kidneys of various animal species. Procedures are known for the isolation of gamma-glutamyl transpeptidase from sheep kidneys, pig kidneys, ox kidneys and pancreas, as well as from kidneys of cows and humans.

gamma-Glutamyl transpeptidase is known to be present in various body organs and tissues, as well as in urine and in blood serum and plasma. Recently, the detection of abnormal levels of gamma-glutamyl transpeptidase in certain body fluids has been found to indicate the presence of certain disease conditions. For example, Szczeklik et al., Gastroenterology, 41: 353–359 (1961) reported that only moderate increases of gamma-glutamyl transpeptidase were observed in patients with viral or chronic hepatitis. However, very high activities were found in patients suffering from obstructive jaundice, biliary cirrhosis, cholangitis, and liver neoplasia, both primary liver cancer and intrahepatic metastases. The enzyme activity in these patients was occasionally 100 times as great as the activity in normal patients. Very high gamma-glutamyl transpeptidase activity, not associated with jaundice, is highly suspicious of a primay or metastatic liver cancer.

In 1966, Nosslin et al., Scand. J. Clin. and Lab. Invest., 18: 178–80 Suppl. 92 (1966) compared gamma-glutamyl transpeptidase activity with alkaline phosphatase in cases consisting of hepatitis and obstructive jaundice. The authors concluded that although phosphatase and gamma-glutamyl transpeptidase had identical reaction patterns, transpeptidase was more demonstrable in the pathological conditions studied.

Further, Lum et al., Clin. Chem. 18: 358–362 (1972) demonstrated that gamma-glutamyl transpeptidase activity was above normal in all forms of liver disease studied (viral hepatitis, cirrhosis, cholecystitis, metastatic carcinoma to liver, pancreatic carcinoma, liver granuloma, and acute pancreatitis). gamma-Glutamyl transpeptidase more sensitively indicated hepatic disease than did alkaline phosphatase, much more so than did leucine aminopeptidase. Moreover, it was found that measurement of gamma-glutamyl transpeptidase activity offered a simple, sensitive, and direct means for distinguishing whether bone or liver was the source of increased serum alkaline phosphatase activity. Activity was highest in obstructive liver disease.

Over the years, a great variety of methods have been described for the determination of gamma-glutamyl transpeptidase concentration in biological fluids. Historically, glutathione was used as the substrate and the action of gamma-glutamyl transpeptidase on the substrate was measured. More recently, synthetic substrates including gamma-D,L-glutamyl-aminopropionitrile; gamma-L-glutamyl-$\alpha$-napthylamide; and N-D,L-gamma-glutamyl-anilide have been utilized in such determinations. In these last mentioned assays, the appearance of one or more cleavage products resulting from the action of the gamma-glutamyl transpeptidase in the biological fluid being tested on the substrate was considered a measure of enzyme activity; improved test procedures resulted by reacting the cleavage product with a dye former in order to utilize photometric instrumentation for measurements. A further simplification of this general test method resulted when gamma-L-glutamyl-p-nitroanilide was used as the substrate, since a colored cleavage product, i.e., p-nitroaniline, resulted which could be measured colorimetrically without further reaction to form a dye.

Determination of gamma-glutamyl transpeptidase activity utilizing gamma-L-glutamyl-p-nitroanilide as the substrate and various modifications of this test method, have been investigated by a number of scientists, including Orlowski, M., Arch. Immunol. Therap. Exptl. 13: 538 (1964); Dimov, D.M. et al., Clin. Chem. Act. 16: 271–277 (1967); and Szasz, G., Clin. Chem. 15: 124–136 (1969).

Among the above mentioned methods for determining gamma-glutamyl transpeptidase activity, the Szasz procedure has gained widespread acceptance and is now generally considered the standard clinical method. The chief advantage of the test is its great simplicity, for in routine clinical testing the omission or acceleration of any procedural steps is particularly desirable. Nonetheless, there are still certain disadvantages to the Szasz method. For example, a sample blank should be run for each serum sample to assure accurate determinations, since sample turbidity often interferes with optical density measurements. In addition, the Szasz method does not take into account non-enzymatic hydrolysis of the substrate; this necessarily limits the accuracy of determinations, due to the fact that high levels of enzymatic activity in any sample being tested could yield optical density readings beyond the range of the usual clinical laboratory instruments. This problem is further compounded in situations where very high levels of bilirubin, which imparts a yellow coloration, are present in the test sample: the yellow color is amplified to the extent that more sophisticated instruments are required for accurate measurements.

For all of the above reasons, automation of the Szasz method would be most difficult.

Thus, there is a real need for an improved method for the determination of gamma-glutamyl transpeptidase concentration in body fluids.

SUMMARY OF THE INVENTION

The invention relates to a method for determining the gamma-glutamyl transpeptidase concentration in biological fluids wherein the test fluid is incubated with a buffered solution of p-nitroanilide, glycylglycine and sodium nitrate for a pre-determined period of time, to obtain a solution of a yellow-colored p-nitroaniline cleavage product, which solution is reacted with a mineral acid solution of 8-hydroxy quinoline sulfate containing a water-soluble, nonionic emulsifier, which mineral acid solution has a pH of from 0.8 to 1.3; after the elapse of 15 seconds to 10 minutes, a sufficient amount of an alkaline solution is added to impart a pH of from 10.5 to 12 to the reaction solution, whereby there is obtained a differently colored reaction solution, the absorbence of which provides a sensitive, accurate measure of gamma-glutamyl transpeptidase concentration in the biological fluid being tested.

DESCRIPTION OF THE INVENTION

A sensitive, accurate method for the determination of gamma-glutamyl transpeptidase activity in biological fluids has now been developed. According to the method of this invention, the biological test fluid is incubated for a pre-determined period of time, with a buffered solution containing p-nitroanilide substrate, glycylglycine, and sodium nitrite to obtain a p-nitroaniline cleavage product in the reaction solution. This reaction solution is further treated with an acid solution of 8-hydroxy quinoline sulfate, containing an emulsifier, at a controlled pH. After the elapse of 15 seconds to 10 minutes, a sufficient amount of alkali is added to bring the reaction solution to an alkaline pH. The optical density of the purple colored reaction solution obtained is then read as a measure of enzyme activity in the biological test fluid.

The novel assay of the invention has been found to be four and one-half times more sensitive than the prior art Szasz method. Thus, there is provided a simple, accurate, and sensitive method for determining enzyme concentration without the necessity of running blanks for each sample being tested. Moreover, the bilirubin normally present in body fluids no longer has an adverse effect on the absorbency readings. The optical density of the purple-colored solution of the cleavage product can be read directly against a standard curve of the absorbence of free p-nitroaniline solutions, subjected to the same dye-forming reactions. The activity of the gamma-glutamyl transpeptidase enzyme is expressed in International Units (I.U.) as the amount of micromoles of p-nitroaniline released per 1,000 ml of serum in one minute.

The substrate used in the assay of this invention is a buffered solution of L-gamma-glutamyl-p-nitroanilide, glycyl-glycine, sodium nitrite and, optionally, magnesium chloride hexahydrate. The L-gamma-glutamyl-p-nitroanilide is the substrate acted upon by the gamma-glutamyl transpeptidase enzyme. The glycylglycine acts as an acceptor for the glutamyl moiety. The sodium nitrite, in an acid environment, diazotizes the p-nitroaniline nitroaniline cleavage product. The magnesium chloride hexahydrate, which is an optional ingredient, is thought to aid in keeping the substrate in solution and is also considered to activate the reaction. However, the use of magnesium chloride hexahydrate is not absolutely necessary in the diagnostic test of the invention.

The buffer in the substrate solution maintains the solution at a pH of from about 7.9 to about 8.4, preferably about 8.1, for optimum enzymatic activity. As the buffer, there may be used (2-amino-2-methyl-propane-1,3-diol)-hydrochloride (known as ammediol-HCl), and tris(hydroxymethyl)amino methane hydrochloride (known as Tris-HCl).

The amount of substrate, glycylglycine, sodium nitrite, and magnesium chloride hexahydrate required for the diagnostic test of this invention is dependent upon the amount of biological fluid being tested. It has been determined that the buffered substrate solution should contain at least 45 micromoles of L-gamma-glutamyl-p-nitroanilide, at least 400 micromoles of glycylglycine, at least 36.2 micromoles of sodium nitrite, and, optionally, at least 100 micromoles of magnesium chloride hexahydrate per milliliter of biological fluid in order to insure that a sufficient amount of reagents is present for reaction with the highest known level of enzyme in the biological fluid being tested. For the sodium nitrite reagent, the minimum amount required is, as mentioned above, at least 36.2 micromoles per milliliter of biological fluid. However, it is generally advantageous to have an excess of sodium nitrite and amounts up to 290 micromoles per milliliter of biological fluid do not interfere with test results. Preferably, 72.4 micromoles of sodium nitrite per milliliter of biological test fluids are used.

The preferred buffer solution contains ammediol hydrochloride as the buffer, and the pH is adjusted to the required level by the addition of additional mineral acid, such as hydrochloric acid.

The dye former used in the process of this invention is a mineral acid solution of 8-hydroxy quinoline sulfate. The acid also serves to stop the enzymatic reaction so that the amount of cleavage product formed within a specified period of time can be measured. In order to stabilize the final colored product being measured it has been found necessary to include a water-soluble, nonionic emulsifier. Among the emulsifiers which may be used for this purpose, there may be mentioned ethoxylated trideceyl alcohol, ethoxylated oleyl alcohol and ethoxylated stearic acid. These products are sold commercially under the tradenames Lipal 610, Lipal 395 and Lipal 20-OA, respectively, by Drew Chemical Co., Inc., 522 Fifth Ave., N.Y., N.Y. Another suitable nonionic emulsifier which may be mentioned is octyl phenoxy polyethoxy ethanol, sold under the tradename Triton X100 by Rohm and Haas Co., Independence Mall West, Philadelphia, Pa.

For use in the diagnostic test of the invention, the dye forming solution must contain from about 11.8 to about 29.5 micromoles, preferably about 14.8 micromoles, of 8-hydroxy quinoline sulfate per milliliter of biological fluid being tested. Usually from about 1 to about 5 percent by volume, based on the total volume of the dye forming solution, of the emulsifier, preferably 1 percent by volume of emulsifier, is required to stabilize the dye formed.

A most important factor in the formation of the dye is the pH of the reaction solution during dye formation. It has been found that maximum coupling of dye takes place at a pH of from about 1.2 to about 2, preferably at a pH of about 1.9 In order to be sure that this pH is obtained, the dye forming solution which is added to the substrate reaction solution, i.e., the mineral acid solution of 8-hydroxy quinoline sulfate containing the emulsifier, must have a pH of from about 0.8 to about 1.3, preferably about 1.1. This pH may be achieved by using an aqueous mineral acid solution, i.e., an aqueous hydrochloric acid solution wherein the acid is at a concentration of from about 0.1N to 0.5N. Acid at this concentration is also sufficient to stop the enzymatic activity prior to dye formation and measurement.

The final addition of the diagnostic test is an alkaline solution which will impart a pH of between about 10.5 to about 12, preferably about 10.5, to the final reaction mixture in order to develop the color of the dye product which is to be measured. Typically, sodium hydroxide is used and it has been found that a minimum concentration of at least 0.05N sodium hydroxide is needed to provide consistent absorbency readings. Increasing the sodium hydroxide concentration up to about 0.25N does not interfere with the results.

If, in the initial substrate solution, the optional magnesium chloride hexahydrate is included, a specified amount of ethylenediaminetetraacetic acid, tetrasodium salt, must be added along with the alkaline solution in order to prevent the precipitation of the magnesium chloride (as magnesium hydroxide) from the final reaction mixture. Such precipitation would, of course, interfere with absorbency readings and destroy the accuracy and sensitivity of the test. A minimum concentration of at least 6.5 micromoles of ethylenediaminetetraacetic acid, per micromole of magnesium chloride hexahydrate, is required to maintain solubility. Larger quantities of ethylenediaminetetraacetic acid salt may be used, i.e. up to about 10 times as much, with similar results. However, since the minimum concentration is sufficient, it is generally preferred.

For the actual assay of this invention, only about 0.1 milliliters of biological fluid is required for testing. Larger quantities of test sample may, of course, be used as desired. Dilution of the sample is not necessary. Thus, blood serum, blood plasma, urine, cerebrospinal fluid and the like biological fluids may be tested directly, according to the method of this invention.

Generally, 0.1 milliliters of sample fluid is added to 1 milliliter of the buffered substrate reagent described above and incubated for a predetermined period of time at a specified temperature. The time and temperature may be varied greatly, but most frequently as short a period of time and as low a temperature as necessary to insure accurate results are preferred Therefore, incubation at about 37°C for 10 minutes is reliable and therefore recommended. After completion of the incubation time, 1 milliliter of the mineral acid reagent solution containing 8-hydroxy quinoline sulfate and the water-soluble, nonionic emulsifier is added to the reaction mixture. After the elapse of about 15 seconds, but no more than 10 minutes, about 5 milliliters of a 0.1N sodium hydroxide solution (containing 0.1% ethylenediaminetetraacetic acid tetrasodium salt, if magnesium chloride hexahydrate is included in the substrate solution) is added to the reaction solution. The absorbency of the final solution is read at 570 nanometers, and this value corresponds to the amount of p-nitroaniline released during the enzymatic reaction. Concentration of p-nitroaniline is determined by reading against a standard curve prepared from absorbencies of an aqueous solution containing various concentrations of free p-nitroaniline. Micromoles of p-nitroaniline obtained are converted to enzymatic activity according to the following equation:

IU = Optical density at 570 nanometers × 0.172

I.U. represents International Units defined as the amount of micromoles of p-nitroaniline released per 1,000 ml. of serum in one minute.

In order to further illustrate the invention, the following examples are given:

EXAMPLE 1

Preparation of the Substrate Solution

L-gamma-Glutamyl-p-nitroaniline, 4.5 millimolar; glycylglycine 40 millimolar; sodium nitrite 7.25 millimolar; and 10 millimolar magnesium chloride hexahydrate. Dissolve 126.3 milligrams L-gamma-glutamyl-p-nitroanilide, 290.7 milligrams glycylglycine, 50 milligrams sodium nitrite and 223.7 milligrams magnesium chloride hexahydrate with constant stirring in 100 milliliters of Ammediol-(2-amino-2-methyl-propane-1,3-diol)-HCl buffer, 0.05M, pH 8.6 at 50°–60°C. The solution has a pH of about 8.05 at 25°C.

EXAMPLE 2

Preparation of the Acid Solution of 8-Hydroxy Quinoline Sulfate

Dissolve 100 milligrams of 8-hydroxy quinoline sulfate in approximately 80 milliliters of 0.2N hydrochloric acid. Add 1 milliliter of Lipal-610 and dilute to 100 milliliters with 0.2N hydrochloric acid.

EXAMPLE 3

Preparation of the Sodium Hydroxide Solution Containing Ethylenediaminetetraacetic Acid Sodium Salt Dissolve 500 milligrams of ethylenediaminetetraacetic acid, tetrasodium salt in 100 milliliters of 0.05N sodium hydroxide.

EXAMPLE 4

Determination of gamma-Glutamyl Transpeptidase in Blood Serum

Place 1 milliliter of the substrate solution of Example 1 in a test tube and add 0.1 milliliter of blood serum. Incubate at 37°C for 10 minutes. When incubation is completed, add 1 milliliter of the reagent solution of Example 2. Wait at least 15 seconds, but no more than 10 minutes and add 5 milliliters of the reagent solution of Example 3. Read the absorbence of the reagent solution on a Gilford 300 N spectrophotometer at 570 nanometers. A reading of 1.033 is obtained. This is read against the standard curve and an amount of .177 micromoles of released p-nitroaniline is obtained. The concentration of gamma-Glutamyl transpeptidase in the test serum is calculated according to the formula:

I.U. = OD × 0.172
I.U. = 1.033 × 0.172
I.U. = 0.177 (or 177 milliunits per milliliter)

EXAMPLE 5

Determination of gamma-Glutamyl Transpeptidase in Urine

Place 1 milliliter of the substrate solution of Example 1 in a test tube and add 0.1 milliliter of urine. Incubate at 37°C for 10 minutes. When incubation is completed, add 1 milliliter of the reagent solution of Example 2. Wait at least 15 seconds, but no more than 10 minutes and add 5 milliliters of the reagent solution of Example 3. Read the absorbence of the reagent solution on a Gilford 300 N spectrophotometer at 570 nanometers. A reading of 0.200 is obtained. This is read against the standard curve and an amount of 0.034 micromoles of released p-nitroaniline is obtained. The concentration of gamma-glutamyl transpeptidase in the test serum is calculated according to the formula:

I.U. = OD × 0.172
I.U. = 0.200 × 0.172
I.U. = 0.034 (or 34 milliunits per milliliter)

I claim:

1. A colorimetric method for the determination of gamma-glutamyl transpeptidase concentrations in biological fluids which comprises:

A. Incubating a sample of the biological fluid with an aqueous substrate solution, said substrate solution comprising at least about 45 micromoles of L- gamma-glutamyl-p-nitroanilide per milliliter of biological fluid, at least 400 micromoles of glycylglycine per milliliter of biological fluid, and at least 36.2 micromoles of sodium nitrite per milliliter of biological fluid in an aqueous solution buffered to maintain a pH of from about 7.9 to about 8.4;

B. Continuing the incubation of solution (A) for a predetermined period of time at a definite temperature to release p-nitroaniline as a result of enzymatic activity;

C. Adding to solution (B) at the end of the incubation time, an aqueous mineral acid solution containing from about 11.8 to about 29.5 micromoles of 8-hydroxy quinoline sulfate per milliliter of biological fluid and from about 1 to about 5 percent by volume, based on the total volume of the mineral acid solution, of a water soluble, nonionic emulsifier, said mineral acid solution having a pH of from about 0.8 to about 1.3;

D. Allowing from about 15 seconds to about 10 minutes to elapse and adding to solution (C) a sufficient amount of an alkaline solution to impart a final pH of from about 10.5 to about 12 to the reaction solution; and E. Reading the optical density of solution (D) as a measure of gamma-glutamyl transpeptidase concentration in the biological fluid.

2. A method according to claim 1 wherein the substrate solution of (A) is buffered to a pH of about 8.1 with a (2-amino-2-methyl-propane-1,3-diol)-HCl buffer system.

3. A method according to claim 2 wherein the mineral acid solution of (C) contains about 14.8 micromoles of 8-hydroxy quinoline sulfate per milliliter of biological fluid and has a pH of about 1.1.

4. A method according to claim 3 wherein the mineral acid solution of (C) contains about 1 percent by volume, based on the total volume of the mineral acid solution of ethoxylated tridecyl alcohol as the water soluble nonionic emulsifier.

5. A method according to claim 1 wherein the substrate solution of (A) additionally contains at least 100 micromoles of magnesium chloride hexahydrate per milliliter of biological fluid, and wherein the alkaline solution of (D) additionally contains at least 6.5 micromoles of ethylenediaminetetraacetic acid, tetrasodium salt per micromole of magnesium chloride hexahydrate in the substrate solution of (A).

6. A method according to claim 5 wherein the substrate solution of (A) is buffered to a pH of about 8.1 with a (2-amino-2-methyl-propane-1,3-diol)-HCl buffer system.

7. A method according to claim 6 wherein the mineral acid solution of (C) contains about 14.8 micromoles of 8-hydroxy quinoline sulfate per milliliter of biological fluid and has a pH of about 1.1.

8. A method according to claim 7 wherein the mineral acid solution of (C) contains about 1 percent by volume, based on the total volume of the mineral acid solution, of ethoxylated tridecyl alcohol as the water soluble nonionic emulsifier.

9. A colorimetric method for the determination of gamma-glutamyl transpeptidase concentrations in biological fluids which comprises:

A. Incubating the sample of the biological fluid with an aqueous substrate solution, said substrate solution comprising about 45 micromoles of L-gamma-glutamyl-p-nitroanilide per milliliter of biological fluid, about 400 micromoles of glycylglycine per milliliter of biological fluid, about 72.4 micromoles of sodium nitrite per milliliter of biological fluid, and about 100 micromoles of magnesium chloride hexahydrate per milliliter of biological fluid, in an aqueous solution buffered to maintain a pH of about 8.1 with a (2-amino-2-methyl-propane-1,3-diol)-HCl buffer system;

B. Continuing the incubation of solution (A) for about ten minutes at about 37°C to release p-nitroaniline as a result of enzymatic activity;

C. Adding to solution (B), at the end of the incubation time, an aqueous hydrochloric acid solution containing about 14.8 micromoles of 8-hydroxy quinoline sulfate per milliliter of biological fluid, and about 1 percent by volume, based on the total volume of the hydrochloric acid solution, of ethoxylated tridecyl alcohol, said solution having a pH of about 1.1;

D. Allowing from about 15 seconds to about 10 minutes to elapse and adding to solution (C) a sufficient amount of an aqueous sodium hydroxide solution to provide a final pH of about 10.5 in the reaction solution, said sodium hydroxide solution containing about 6.5 micromoles of ethylenediaminetetraacetic acid, tetrasodium salt per micromole of magnesium chloride hexahydrate in the substrate solution A; and E. Reading the optical density of solution (D) as a measure of gamma-glutamyl transpeptidase concentration in the biological fluid.

10. A method according to claim 1 wherein the substrate solution of (A) is buffered to a pH of about 8.1 with a tris(hydroxy-methyl)amino methane hydrochloride buffer system.

11. A method according to claim 6 wherein the substrate solution of (A) is buffered to a pH of about 8.1 with a tris(hydroxy-methyl)amino methane hydrochloride buffer system.

* * * * *